United States Patent
Kijima

(10) Patent No.: US 10,082,673 B2
(45) Date of Patent: Sep. 25, 2018

(54) LASER LIGHT SOURCE DEVICE AND VIDEO DISPLAY DEVICE

(71) Applicant: MITSUBISHI ELECTRIC CORPORATION, Tokyo (JP)

(72) Inventor: Takumi Kijima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/516,869

(22) PCT Filed: Jan. 19, 2016

(86) PCT No.: PCT/JP2016/051403
§ 371 (c)(1),
(2) Date: Apr. 4, 2017

(87) PCT Pub. No.: WO2016/117540
PCT Pub. Date: Jul. 28, 2016

(65) Prior Publication Data
US 2017/0285354 A1  Oct. 5, 2017

(30) Foreign Application Priority Data
Jan. 23, 2015 (JP) .................. 2015-010926

(51) Int. Cl.
*G02B 27/14* (2006.01)
*G02B 27/18* (2006.01)
(Continued)

(52) U.S. Cl.
CPC ......... *G02B 27/14* (2013.01); *G02B 27/0977* (2013.01); *G02B 27/18* (2013.01); *H04N 9/3161* (2013.01)

(58) Field of Classification Search
CPC .... G02B 27/14; G02B 27/144; G02B 27/142; G02B 27/283; G02B 27/0172
(Continued)

(56) References Cited

U.S. PATENT DOCUMENTS

| | | |
|---|---|---|
| 4,958,893 A | 9/1990 | Noguchi et al. |
| 4,978,197 A | 12/1990 | Horikawa |

(Continued)

FOREIGN PATENT DOCUMENTS

| | | |
|---|---|---|
| JP | 61-208023 A | 9/1986 |
| JP | 2-60179 A | 2/1990 |

(Continued)

OTHER PUBLICATIONS

International Search Report for PCT/JP2016/051403 (PCT/ISA/210) dated Apr. 5, 2016.

*Primary Examiner* — Mohammed Hasan
(74) *Attorney, Agent, or Firm* — Birch, Stewart, Kolasch & Birch, LLP

(57) ABSTRACT

It is an object to provide a small and inexpensive laser light source device capable of efficiently focusing rays of laser light from a plurality of laser light sources so as to increase output, and to provide an inexpensive and small video display device. The plurality of laser light source units are arranged in such manner that the plurality of laser light source units adjacent to each other adjoin each other in series. The laser light source device further includes a second reflection mirror reflecting, in a third direction, a ray of laser light reflected in a second direction. The second reflection mirror is held by a mirror holder belonging to one laser light source unit among the plurality of laser light source units.

4 Claims, 14 Drawing Sheets

(51) Int. Cl.
  *G02B 27/09* (2006.01)
  *H04N 9/31* (2006.01)
(58) Field of Classification Search
  USPC .............................. 359/629–641, 201, 210
  See application file for complete search history.

(56) References Cited

U.S. PATENT DOCUMENTS

| | | | |
|---|---|---|---|
| 9,249,949 B2 | 2/2016 | Matsubara | |
| 9,322,530 B2 | 4/2016 | Kimura et al. | |
| 9,823,558 B2* | 11/2017 | Akiyama | G03B 21/2046 |
| 2004/0125427 A1* | 7/2004 | Shim | G02B 26/123 |
| | | | 359/204.1 |
| 2010/0223810 A1* | 9/2010 | Lekhtman | A43B 13/181 |
| | | | 36/27 |
| 2011/0037953 A1 | 2/2011 | Nizani et al. | |
| 2014/0240977 A1 | 8/2014 | Hu et al. | |
| 2016/0223810 A1* | 8/2016 | Matozaki | G02B 26/10 |
| 2016/0341972 A1* | 11/2016 | Yamada | G03B 21/00 |

FOREIGN PATENT DOCUMENTS

| | | |
|---|---|---|
| JP | 2010-541001 A | 12/2010 |
| JP | 4739819 B2 | 8/2011 |
| JP | 2015-501508 A | 1/2015 |
| WO | 2009/040822 A2 | 4/2009 |
| WO | 2012/063322 A1 | 5/2012 |
| WO | 2013/047542 A1 | 4/2013 |

* cited by examiner

F I G. 4
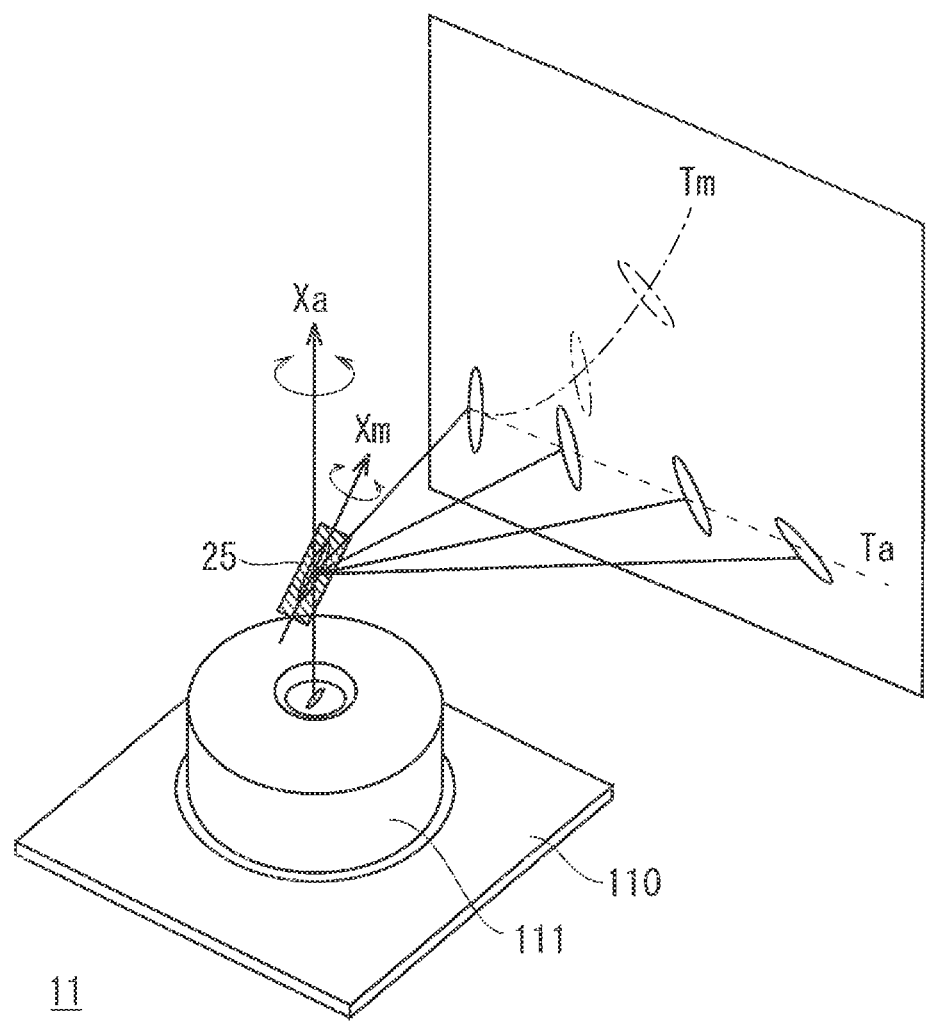

FIG. 6A
FIG. 6B
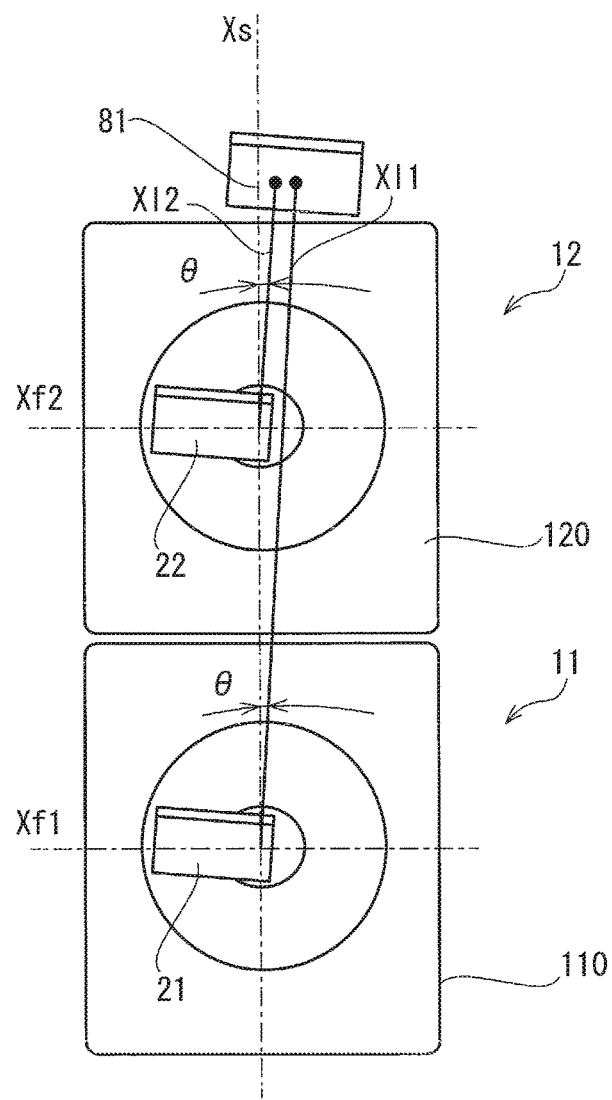
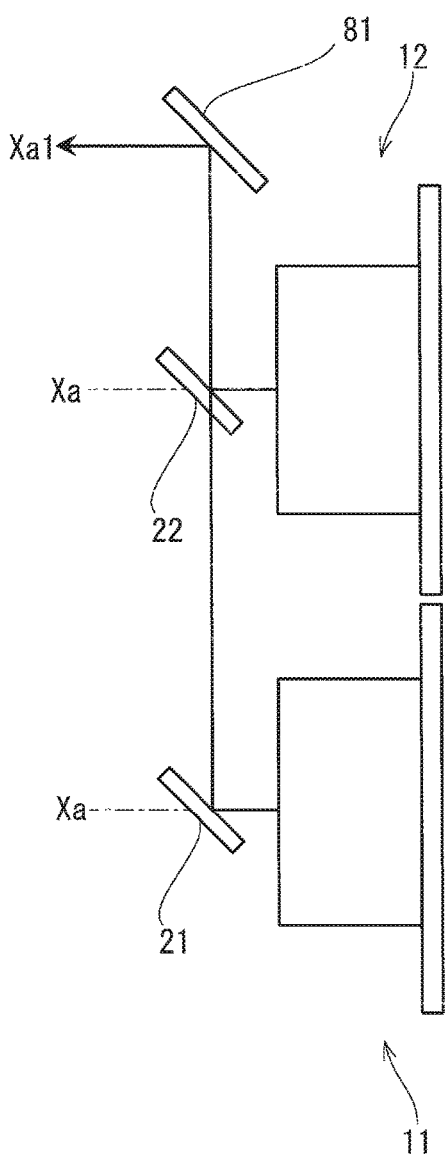

F I G. 7
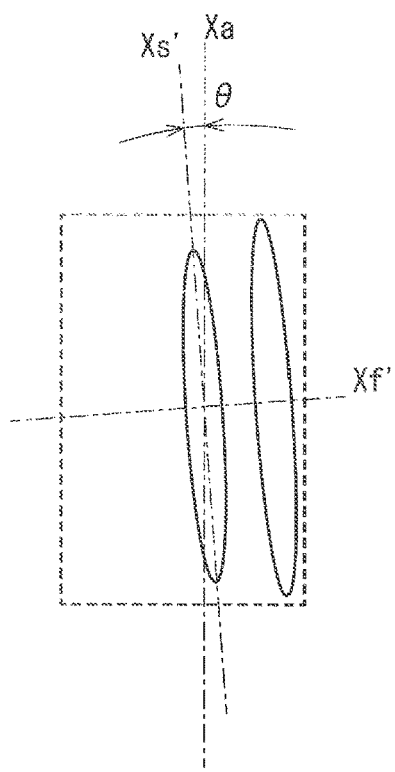
F I G. 8
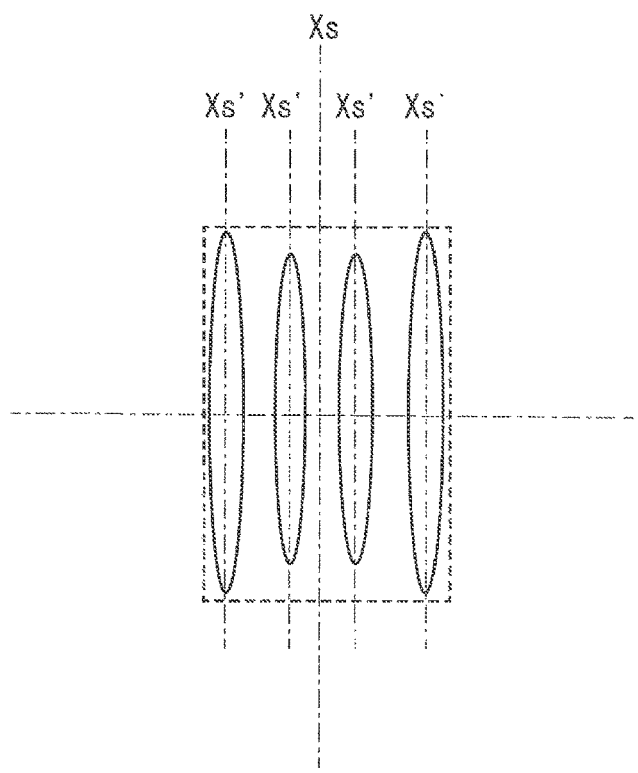

US 10,082,673 B2

LASER LIGHT SOURCE DEVICE AND VIDEO DISPLAY DEVICE

TECHNICAL FIELD

The present invention relates to a small and inexpensive laser light source device that spatially combines rays of laser light emitted from a plurality of laser light sources and increases output, and to a video display device provided with such a laser light source device.

BACKGROUND ART

Projector apparatuses have recently needed to have higher luminance because such projector apparatuses are used to display projected images on large-screens for, for instance, digital movie theaters or large conference rooms and further for outdoor projection mapping. Some digital movie theaters have been already about to introduce laser projectors provided with laser light source devices. Thus, a high-luminance laser light source is greatly expected. A typical single laser module can increase output within a limited range, and thus in such a high-luminance laser projector, laser beams (rays of laser light) from a plurality of laser modules are efficiently combined to increase output of light from a laser light source device.

Efforts are made to combine the laser beams from the plurality of laser modules so as to increase a spatial density of bundles of light, and also to minimize optical etendue for a light source device to have high luminance. For instance, proposed is a method for converting into smaller beam intervals than beam-emission-axis intervals of the plurality of laser modules using stepwise-arranged mirror means (e.g., Patent Documents 1 and 2).

Unfortunately, the use of the mirror means, which are stepwise arranged, the mirror means that are more remote from the laser modules are more sensitive to variations in performance due to the shapes of components and to the accuracy of their positions. As a result, a holder setting the relative positions of the laser modules and mirror means needs to be highly accurate. In addition, the mirror means need prism mirrors each having a high-accurate size, and steps of adjusting the positions of the individual mirror means or mirror-means adjustment functions with high accuracy are necessary. It is thus difficult to form an inexpensive laser light source device. Such a tendency is more noticeable in more laser modules. Thus, the stepwise-arranged mirror means are unfortunately unsuitable in an effort to further increase the output of the laser light source device. Accordingly, proposed is a method of positioning a parallel plate made of a transparent material, obliquely to a collimated bundle of light in order to increase the spatial density of the bundles of light without the use of the stepwise-arranged mirror means (e.g., see Patent Document 3).

PRIOR ART DOCUMENT

Patent Document

Patent Document 1: Japanese Patent Application Laid-Open No. 61-208023
Patent Document 2: Japanese Patent Application Laid-Open No. 2-60179
Patent Document 3: Japanese Patent No. 4739819

SUMMARY OF INVENTION

Problem to be Solved by the Invention

In the method described in Patent Document 3, the thickness and positional angle of the parallel plate and further the refractive index of the transparent material enable an increase in density of the bundle of light as transmitted through the parallel plate. However, if the laser modules each have a large size and if not-yet-combined rays of laser light need to have emission axes spaced about 50 mm apart from each other, a parallel plate with a high refractive index would need to have a thickness of several tens of millimeters or greater. Hence, the parallel plate and a structure holding the parallel plate increase in weight and volume. It is thus difficult to form an inexpensive and small laser light source.

As such, it is an object of the present invention to provide a small and inexpensive laser light source device capable of efficiently focusing rays of laser light from a plurality of laser light sources so as to increase output, and to provide a video display device.

Means for Solving the Problem

The laser light source device in the present invention includes a plurality of laser light source units. The plurality of laser light source units each include a laser light source emitting a ray of laser light with an elliptic cross section in a first direction, a first reflection mirror disposed on an optical axis of the ray of laser light and reflecting the ray of laser light in a second direction, and a mirror holder holding the first reflection mirror. The plurality of laser light source units are arranged in such a manner that the plurality of laser light source units adjacent to each other adjoin each other in series. The laser light source device further includes a second reflection mirror reflecting, in a third direction, the ray of laser light reflected in the second direction. The second reflection mirror is held by the mirror holder belonging to one laser light source unit among the plurality of laser light source units.

A video display device according to the present invention includes the laser light source device, an equalization unit equalizing an intensity distribution of the rays of laser light emitted from the laser light source device, an illumination optical system radiating the rays of laser light equalized by the equalization unit as illumination light; a video display element spatially modulating the illumination light in response to an external video signal, and a projection optical system projecting the illumination light spatially modulated by the video display element on a screen.

Effects of the Invention

The laser light source device according to the present invention is configured such that the plurality of laser light source units are arranged in series, and that the first reflection mirror and second reflection mirror disposed on the optical axes of the respective rays of laser light reflect the individual rays of laser light in the same direction. Such a configuration enables spatial combination of the rays of laser light with a minimum increase in etendue while keeping the optical axes parallel with each other.

Using the second reflection mirror provides a shorter length of the entire optical path than projecting the rays of laser light in a direction in which the laser light source units are disposed by using the first reflection mirror alone. This minimizes the enlargement of the cross sections of the rays of laser light due to divergence angles, to thus achieve a further small laser light source device.

The individual laser light source units are configured such that the first reflection mirrors of the same type are held by the respective mirror holders of the same type. Such a configuration minimizes types of components, provides an inexpensive, small and easy-to-be-assembled laser light source device, and further provides an inexpensive and small video display device provided with the same.

These and other objects, features, aspects and advantages of the present invention will become more apparent from the following detailed description of the present invention when taken in conjunction with the accompanying drawings.

BRIEF DESCRIPTION OF DRAWINGS

FIG. 4 is a schematic diagram simply illustrating positions of a bundle of laser array light in a second direction and rotation ways.

FIGS. 6A and 6B are schematic diagrams illustrating a relationship between the placement of the first reflection mirrors and of a second reflection mirror, and directions in which rays of laser light are emitted.

FIG. 7 is a schematic diagram of an image of a combined bundle of light of two bundles of laser array light rearranged in the second direction, where the image is viewed in cross section in a plane perpendicular to an optical axis.

FIG. 8 is a schematic diagram of images of a plurality of bundles of laser array light rearranged in a third direction, where the images are viewed in cross section in a plane perpendicular to the optical axis.

DESCRIPTION OF EMBODIMENTS

First Embodiment

Figure 1A:
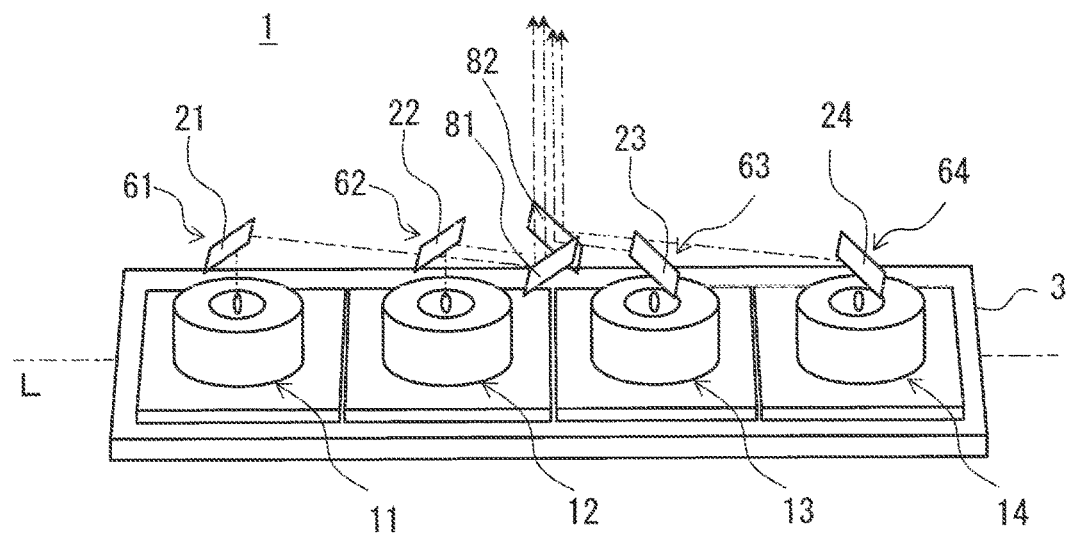
FIGS. 1A, 1B, and 1C are schematic diagrams of a configuration of a laser light source device according to a first embodiment.
Figure 1B:
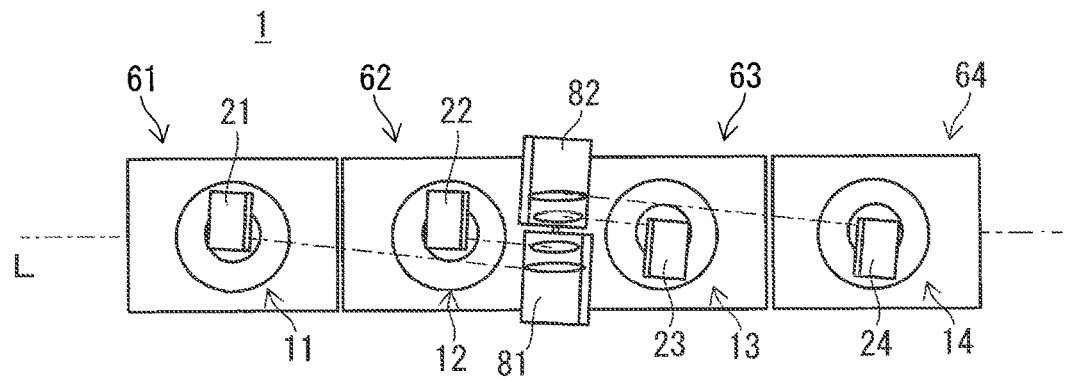
Figure 1C:
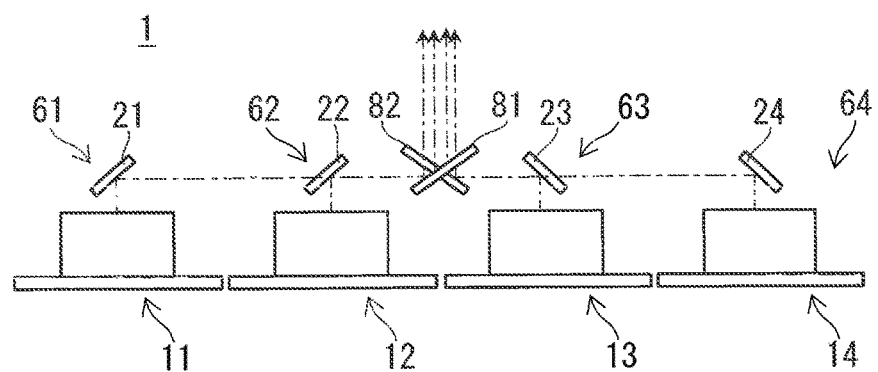

The following describes a first embodiment of the present invention with reference to the drawings. FIGS. 1A, 1B, and 1C are schematic diagrams of a configuration of a laser light source device 1 according to the first embodiment. FIG. 1A is a perspective view of the laser light source device 1. FIG. 1B is a plan view of the laser light source device 1. FIG. 1C is a side view of the laser light source device 1. It is noted that FIGS. 1B and 1C omit a base plate 3.

As illustrated in FIGS. 1A, 1B, and 1C, the laser light source device 1 includes laser light source units 61, 62, 63, and 64, and the base plate 3. The laser light source units 61, 62, 63, and 64 respectively include: laser light sources 11, 12, 13, and 14; first reflection mirrors 21, 22, 23, and 24 corresponding one-to-one to the laser light sources 11, 12, 13, and 14; second reflection mirrors 81 and 82; and mirror holders, which are not shown in FIGS. 1A, 1B, and 1C, but the details of which will follow. The base plate 3 is a member for arranging the laser light sources 11, 12, 13, and 14 on the same plane in series. In addition, the first reflection mirrors 21, 22, 23, and 24 are held by the respective mirror holder. In addition, the second reflection mirrors 81 and 82 are held by the respective mirror holders belonging to some of the laser light source units, i.e., the laser light source units 63 and 62 among the laser light source unit 61, 62, 63, and 64.

The laser light sources 11, 12, 13, and 14 are semiconductor lasers, for instance, and emit rays of laser light in a first direction. The emitted rays of laser light, which have different characteristics of diverging in two directions orthogonal to each other, are elliptic in cross section. Here, FIG. 1A simply illustrates the elliptic cross sections of rays of the laser light in light-emission widows of the laser light sources. The laser light sources 11 and 12 are arranged on the base plate 3 so that the longer axes of these ellipses are aligned along a reference line L. The laser light sources 13 and 14, although aligned along the reference line L, like the laser light sources 11 and 12, are arranged on the base plate 3 while facing the laser light sources 11 and 12 (i.e., with the laser light sources 11 and 12 being turned 180 degrees).

The first reflection mirrors 21, 22, 23, and 24 are disposed on optical axes of the laser light sources 11, 12, 13, and 14. The first reflection mirrors 21, 22, 23, and 24 are also set to have reflective surfaces of the first reflection mirrors 21, 22, 23, and 24 are inclined at an inclination angle of 45 degrees with respect to the base plate 3. The first reflection mirror 21, 22, 23, and 24 bend (reflect) the rays of laser light emitted in a direction perpendicular to the base plate 3, in a second direction so that the rays of laser light as emitted are in parallel with the base plate 3. Here, the laser light sources 11 and 12 and the laser light sources 13 and 14 are provided to face each other, and thus the second directions of the individual rays of laser light are toward the center in a longitudinal direction of the base plate 3 and are in parallel with each other. Further, the individual first reflection mirrors 21, 22, 23, and 24 have adaptable angles of rotation with respect to the optical axes of the laser light sources 11, 12, 13, and 14. This allows the traveling directions of the rays of laser light to be set freely. For the laser light source units 63 and 64, a positional relationship between the laser light sources 13 and 14 and the first reflection mirrors 23 and 24 is the same as for the laser light source units 61 and 62. The positional relationship is thus not described herein.

Reference is now made to the second reflection mirrors 81 and 82. The second reflection mirror 81 is disposed on the optical axes of the rays of laser light in the second direction, bent by the first reflection mirrors 21 and 22. The second reflection mirror 81 is also provided in parallel with the reflective surfaces of the first reflection mirrors 21 and 22 with a reflective surface of the second reflection mirror 81 and the reflective surfaces of the first reflection mirrors 21 and 22 facing each other. In other words, the reflective surface of the second reflection mirror 81 is inclined at an inclination of 45 degrees with respect to the base plate 3. The reflection mirror 81 bends (reflects) the rays of laser light in a third direction so as to be in parallel with the rays of laser light emitted from the laser light sources 11 and 12 in the direction perpendicular to the base plate 3.

The second reflection mirror 82 is disposed on the optical axis of the rays of laser light in the second direction of the laser light bent by the first reflection mirrors 23 and 24. The second reflection mirror 82 is also provided in parallel with the reflective surfaces of the first reflection mirrors 23 and 24 with a reflection surface of the second reflection mirror 82 and the reflective surfaces of the first reflection mirrors 23 and 24 facing each other. In other words, the reflective surface of the second reflection mirror 82 is inclined at an inclination angle of 45 degrees with respect to the base plate 3. The reflection mirror 82 and bends (reflects) the rays of laser light in the third direction so as to be in parallel with the rays of laser light emitted from the laser light sources 13 and 14 in the direction perpendicular to the base plate 3.

The rays of laser light have elliptic images at the reflective surfaces of the first reflection mirrors 21 and 22. Thus, the first reflection mirrors 21 and 22 are such rotation angles with respect to the optical axes of the laser light sources 11 and 12 that a longer-axis direction of the elliptic images and a direction (second direction) of maximum inclined lines of the inclined surfaces (reflective surfaces of the first reflection mirrors 21 and 22) form a predetermined angle. In addition, as illustrated in FIG. 1A, the first reflection mirrors 21 and 22 in their entireties are disposed on one side so that intersections of the optical axes of the laser light sources 11 and 12 and the first reflection mirrors 21 and 22 are located near the edges of the first reflection mirrors 21 and 22. It is noted that configurations of first reflection mirrors 23 and 24, which are the same as those of the first reflection mirrors 21 and 22, are not described herein.

Such rotation angles of the first reflection mirrors 21 and 22, and such positions of the first reflection mirrors enable, for instance, the ray of laser light from the laser light source 11, bent at the first reflection mirror 21 to travel to pass through near (a side of) the first reflection mirror 22 of the laser light source unit 62 adjacent to the laser light source unit 61 in the traveling direction of the ray of laser light. Setting the corresponding first reflection mirror 24 in a similar manner enables the ray of laser light from the laser light source 14 of the laser light source unit 64 to travel to pass through near (a side of) the first reflection mirror 23 of the laser light source unit 63 adjacent to the laser light source unit 64. The first reflection mirror 23 and the first reflection mirror 22 are set in a similar manner. This enables the rays of laser light bent by the individual first reflection mirrors to be set so as to be in almost parallel with each other. As a result, as illustrated in FIG. 1B, the rays of laser light with the elliptic cross sections, from the laser light sources 11, 12, 13, and 14 of the plurality of laser light source units 61, 62, 63, and 64 adjoining each other are rearranged to be close to each other in a shorter-axis direction of the ellipses.

The laser light sources 11, 12, 13, and 14 each may be based on a semiconductor laser with a single emitter, or each may be based on a semiconductor laser array with multiple emitters. For instance, these light sources include emitters each having a size of 120 μm and being distant 700 μm apart from each other, and the light sources include six emitters and emitters arranged at substantially equal intervals in a direction of a 3.5 mm array-width. A bundle of laser array light emitted from the semiconductor laser array have two divergence angles greatly different from each other: one is in a direction of an array-width (Slow-axis or Xs); and the other is in a direction perpendicular to the direction of the array-width (Fast-axis or Xf). The latter divergence angle is larger than the former divergence angle. For a Fast-axis direction, a cylindrical lens is disposed immediately behind an emitter to collimate light diverging from the semiconductor laser array, and the divergence angle is minimized to efficiently use the light, for instance. The cylindrical lens has a focal length of about 1.2 mm. The divergence angle of the bundle of laser array light is defined by an angle (full angle) in a direction that satisfies a light intensity of $1/e^2$ with respect to a direction that satisfies a maximum light intensity.

Under the influence of the cylindrical lens, the divergence angles of the bundles of laser array light emitted from the laser light sources 11, 12, 13, and 14 have two divergence characteristics greatly different from each other in two directions orthogonal to each other: one is about one degree in the Fast-axis direction; and the other is about five degrees in a Slow-axis direction. In this way, any laser light sources whose rays of laser light have elliptic cross sections, regardless of laser light sources based on a single emitter or based on multiple emitters in combination with a cylindrical lens, effectively serves as the laser light source device 1 and achieves a desired effect. It is noted that the number of the laser light sources, the size of each emitter, the interval of the emitters, the number of the emitters, and the focal length of the cylindrical lens is not limited to the above value.

Figure 2:
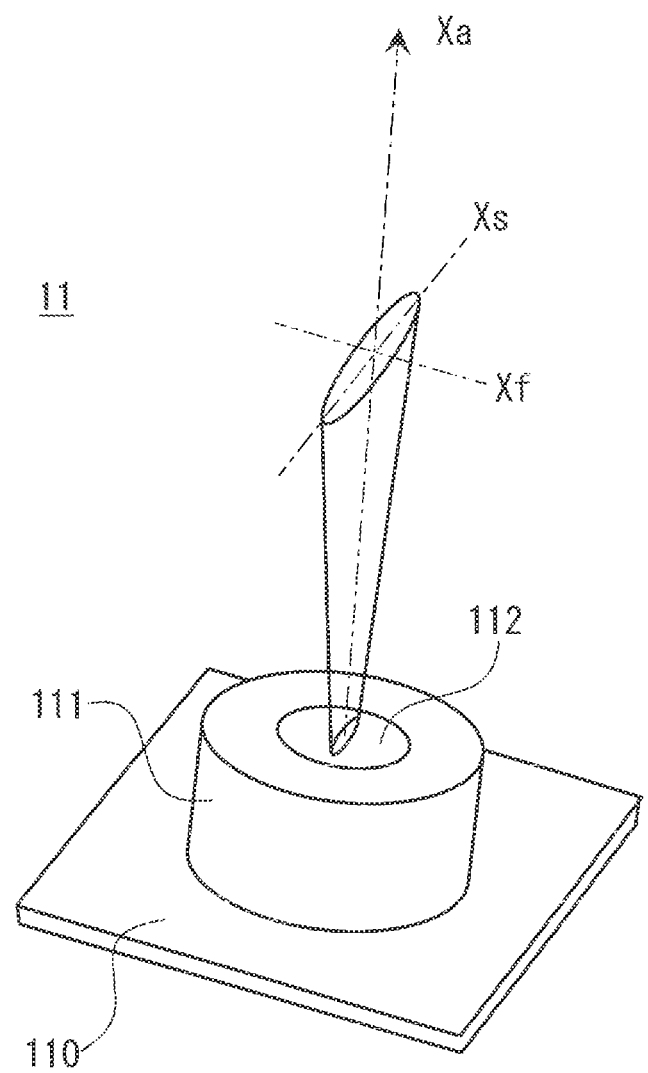
FIG. 2 is a schematic diagram of a configuration of a laser light source.

Reference is now made to a configuration of the laser light source 11 that includes a semiconductor laser array. FIG. 2 is a schematic diagram of the configuration of the laser light source 11. The semiconductor laser array and a cylindrical lens are accommodated in a cap 111 attached to a stem 110. The bundle of laser array light as collimated is emitted in a direction of the substantial normal to a plan (upper surface) of the stem 110 through a windowpane 112. Its optical axis is denoted by Xa. The stem 110 is a substantially rectangular plate member. The semiconductor laser array is provided so that the Fast-axis, i.e., Xf and the Slow-axis, i.e., Xs are in substantially parallel with vertical and horizontal ridgelines of the stem 110. In FIG. 2, an ellipse simply illustrates the slim cross section of the bundle of laser array light, like in FIG. 1A.

The stem 110, i.e., the plate member has a specified, predetermined degree of parallelism and degree of flatness, and is a basis for orienting and positioning the bundle of laser array light emitted from the laser light source 11. Consequently, the plurality of laser light sources are accurately arranged on the base plate 3 via the stem. The cap 111 is a metal member whose top surface is provided with the windowpane 112 where the bundle of laser array light is emitted, and is bonded to the stem 110 by, for instance, solder or brazing to constitute a sealing structure. As such, major components including the semiconductor laser array are disposed in a sealed inner space. This enables the laser light source 11 to be easily handled and enables a greatly high resistance against environment to be maintained.

Figure 3:
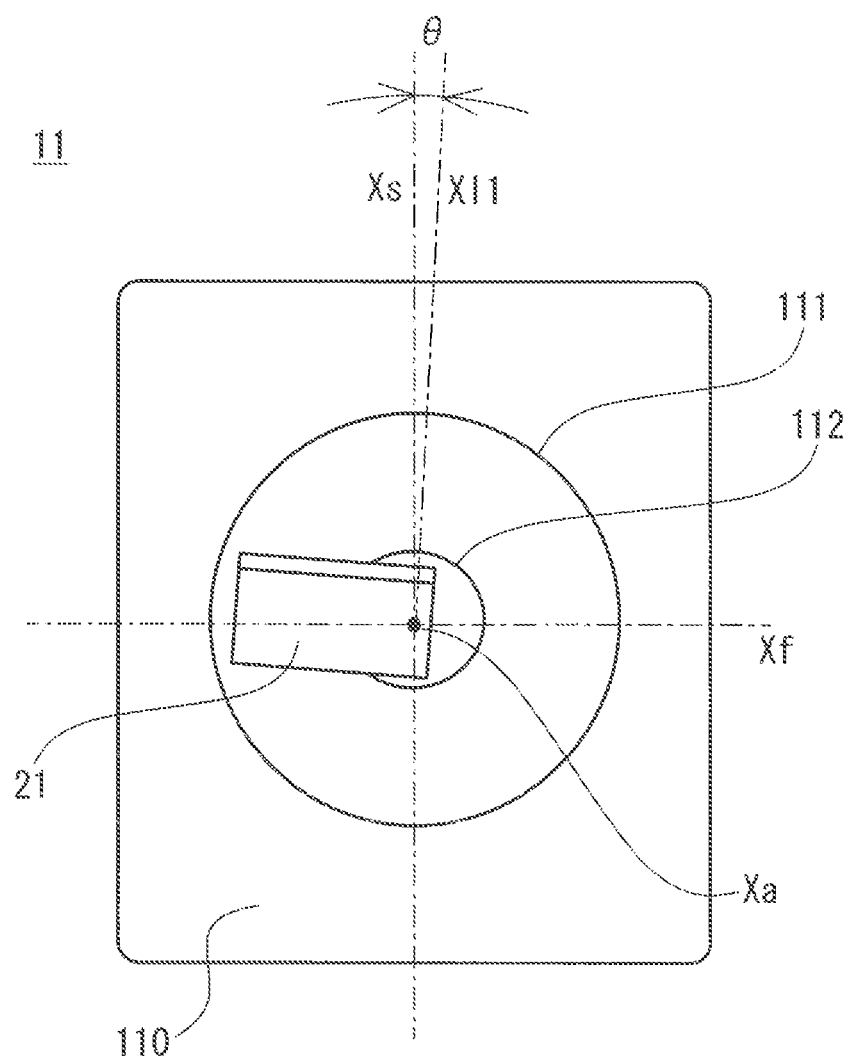
FIG. 3 is a schematic diagram illustrating a relationship between the placement of a first reflection mirror and a direction in which a ray of laser light is emitted.

The following describes a relationship between the placement of the first reflection mirror 21 and a direction in which the ray of laser light is emitted, including the second direction, with reference to FIG. 3. FIG. 3 is a schematic diagram illustrating the relationship between the placement of the first reflection mirror 21 and a direction in which the ray of laser light is emitted. It is noted that configurations of the first reflection mirror 22, 23, and 24, which are the same as that of the first reflection mirror 21, are not described herein. The first reflection mirror 21, which bends the bundle of laser array light emitted from the laser light source 11 at 90 degrees, is provided to be inclined at 45 degrees with respect to the optical axis Xa in FIG. 2. The bundle of laser array light as reflected by the first reflection mirror 21 is bent in the second direction to be in substantially parallel with the upper surface of the stem 110. The first reflection mirror 21 rotates at an angle θ about the optical axis Xa. The bundle of laser array light as reflected by the first reflection mirror 21 has an optical axis X11 that is also inclined at the angle θ with respect to the optical axis Xs. In other words, the angle θ formed by the optical axis X11 and the optical axis Xs is adjustable in accordance with an angle of rotation of the first reflection mirror 21 about the optical axis Xa.

FIG. 4 is a schematic diagram simply illustrating positions of the bundle of laser array light and rotation ways. FIG. 4 illustrates a difference between a path of the bundle of laser array light when the first reflection mirror 21 rotates about the optical axis Xa, and a path of the bundle of laser array light when the first reflection mirror 21 rotates about another optical axis. The bundle of laser array light emitted from the laser light source 11, which is simply illustrated by the aforementioned, slim and elliptic cross section, has a further slim image on the 45 degree-inclined first reflection mirror 21, and an effective area 25 of the first reflection mirror 21, covering this is a slim rectangle as illustrated by an obliquely hatched area.

When the effective area 25 rotates about the optical axis Xa, the image of the bundle of laser array light has a path Ta in an observation plane that is positioned apart from the laser light source 11 by a predetermined distance and is in parallel with the optical axis Xa. In other words, when the angle of rotation about the optical axis X increases, the image of the bundle of laser array light changes its position while rotating, without changing its height in a direction of the optical axis Xa. In this case, this path Ta obviously would have a constant height if the observation plane is distant further away from the laser light source 11.

Meanwhile, when the effective area 25 rotates about an axis Xm in a longer-side direction of the effective area 25, the image of the bundle of laser array light sharply changes its height while moving in a path Tm like a parabola. A sufficiently small rotation axis of the first reflection mirror 21 does not result in a serious difference between both, whereas a large distance between the laser light source 11 and the observation plane has a serious effect due to a remarkable change in position of the image. In other words, for the continuous arrangement of the laser light sources 11, 12, 13, and 14 as illustrated in FIGS. 1A, 1B, and 1C, the rotation of the first reflection mirror 21 about the optical axis Xa is effective in order to achieve a well-organized, spatial combination of a plurality of bundles of laser array light and to have a small effect on a height direction of the laser light source device 1.

Figure 5:
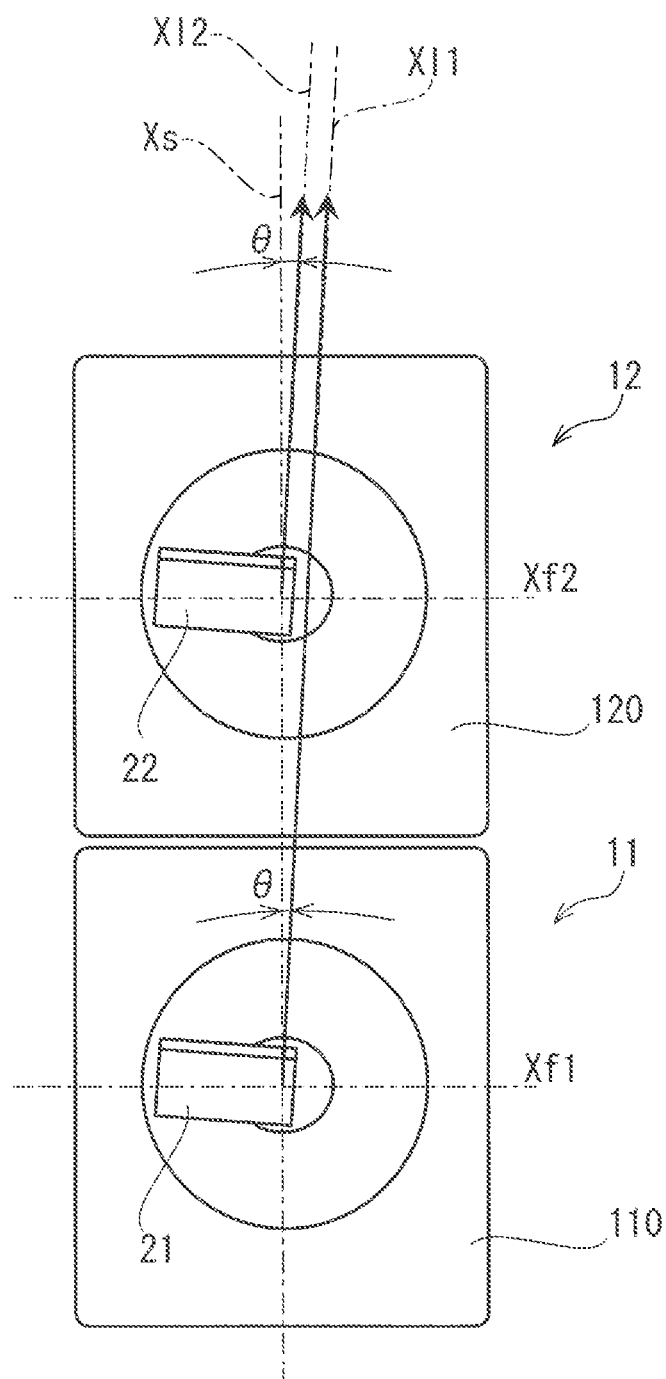
FIG. 5 is a schematic diagram illustrating an example of two laser light sources arranged in parallel along an optical axis Xs.

FIG. 5 is a schematic diagram illustrating an example of the two laser light sources 11 and 12, whose mirrors are so provided as described above, arranged in parallel along the optical axis Xs. The bundle of laser array light emitted from the laser light source 11 is bent at the first reflection mirror 21 to constitute the optical axis X11 and pass through near (the side of) the first reflection mirror 22 disposed in the laser light source 12 adjacent to the laser light source 11. The bundle of laser array light emitted from the laser light source 12 is bent at the first reflection mirror 22 to constitute an optical axis X12. The optical axis X11 and the optical axis X12 are in substantially parallel with each other, and the optical axis X11 and the optical axis X12 desirably form an angle of one degree or smaller. In addition, the angle θ at which the first reflection mirror 21 rotates is desirably selected to such a maximum extent that the bundle of laser array light travelling along the optical axis X11 does not interfere the first reflection mirror 22. Further, the first reflection mirrors 21 and 22 have the same angle of rotation, i.e., the angle θ.

The following describes the second reflection mirror 81 with reference to FIGS. 6A and 6B. FIGS. 6A and 6B are schematic diagrams illustrating a relationship between the placement of the second reflection mirror 81 and directions in which the rays of laser light are emitted. FIG. 6A is a plan view of the laser light sources 11 and 12. FIG. 6B is a side view of the laser light sources 11 and 12. It is noted that a configuration of the second reflection mirror 82, which is the same as that of the second reflection mirror 81, is not described herein. The second reflection mirror 81 is provided to intersect the optical axes X11 and X12, and is provided in parallel with the first reflection mirrors 21 and 22 so that the reflective surface of the second reflection mirror 81 faces the reflective surfaces of the first reflection mirrors 21 and 22.

The two bundles of laser array light, bent by the first reflection mirrors 21 and 22 to travel along the optical axes X11 and X12, are reflected by the second reflection mirror 81 to bend in substantially parallel with a direction of the normal to planes (upper surfaces) of stems 110 and 120. At this time, although the optical axes X11 and X12 of the bundles of laser array light are inclined at the angle θ with respect to the optical axis Xs in pre-reflection of the bundles of laser array light at the second reflection mirror 81, the bundles of laser array light in post-reflection are in substantially parallel with the optical axis Xa of the laser light sources 11 and 12.

The aforementioned configurations enable the bundles of laser array light of the plurality of laser light sources 11 and 12 that need to be disposed in a position distant by the length of the sides of the stem 110 to be spatially rearranged in high density. This achieves a combined bundle of light with small etendue, in which the bundles of laser array light are focused in high density.

For instance, the bundle of laser array light of the first reflection mirror 21 in a direction of the optical axis Xf has a width of about 1.7 mm under the following condition: the first reflection mirror 21 is disposed in a height of 20 mm from a plurality of emitters; the divergence angle along the Fast-axis is about one degree in full angle; the side of the stem 110 along the optical axis Xs has a length of 40 mm; and a direction perpendicular to an array-width of the emitter has a width of 1 mm. The angle θ at which the first reflection mirror 21 rotates about the optical axis Xa is obtained from a condition for the bundle of laser array light from the adjacent laser light source 12 that is 40 mm distant to pass through near the first reflection mirror 21 whose effective size is specified with a predetermined margin while maintaining a predetermined interval. For the above parameter, when the angle θ at which the first reflection mirror 21 rotates about the optical axis Xa is specified to be about 3.5 degrees, the first reflection mirror 21 is set to have a size margin of about 0.5 mm, and the interval between the first reflection mirror 21 and the bundle of laser array light is set to be about 1 mm. However, the positioning height of the first reflection mirror 21, the divergence angle along the Fast-axis, the length of side of the stem 110 along the optical axis Xs, the width in the direction vertical to the array-width of the emitter, the size margin of the first reflection mirror 21, and the interval between the first reflection mirror 21 and the bundle of laser array light are not limited to the aforementioned values.

FIG. 7 is a schematic diagram of an image of the combined bundle of laser array light of two bundles of laser array light rearranged in the second direction, where the image is viewed in cross section in a plane perpendicular to the optical axis Xs. It is noted that FIG. 7 illustrates the image, where the two laser light sources 11 and 12 are arranged in parallel along the optical axis Xs and the bundles of laser array light are bent at the first reflection mirrors 21 and 22 to be rearranged in the second direction, as illustrated in FIGS. 6A and 6B. Here, the bundles of laser array light are rearranged at a substantially equal interval, using the first reflection mirrors 21 and 22 corresponding to the two laser light sources 11 and 12. At this time, the first reflection mirrors 21 and 22 have the same angle of rotation, i.e., angle θ, and thus the images of the bundles of laser array light, reflected by the individual first reflection mirrors 21 and 22 have the same longer-axis direction. A slim ellipse simply illustrates the image of the bundle of laser array light, where Xs' denotes a longer-axis of the image of the bundles of laser array light; and Xf', a shorter-axis of the same. In addition, for the bundles of laser array light bent at the first reflection mirrors 23 and 24, which are provided to face the first reflection mirrors 21 and 22, the same image is viewed from the back of the plane perpendicular to the aforementioned axis Xs'.

Now, FIG. 8 is a schematic diagram of images of the plurality of bundles of laser array light rearranged in the third direction, where the images are viewed in cross section in a plane perpendicular to the optical axis. It is noted that FIG. 8 illustrates the images rearranged in the third direction, using the second reflection mirror 81, which is provided in parallel with the first reflection mirrors 21 and 22, and using the second reflection mirror 82, which is provided in parallel with the first reflection mirrors 23 and 24. The longer-axis Xs' of the slim ellipses of the bundles of laser array light in post-reflection is in substantially parallel with the original longer-axis Xs of the laser light sources 11 and 12. In other words, an inclination angle θ of the bundles of laser array light is almost zero.

Figure 9:
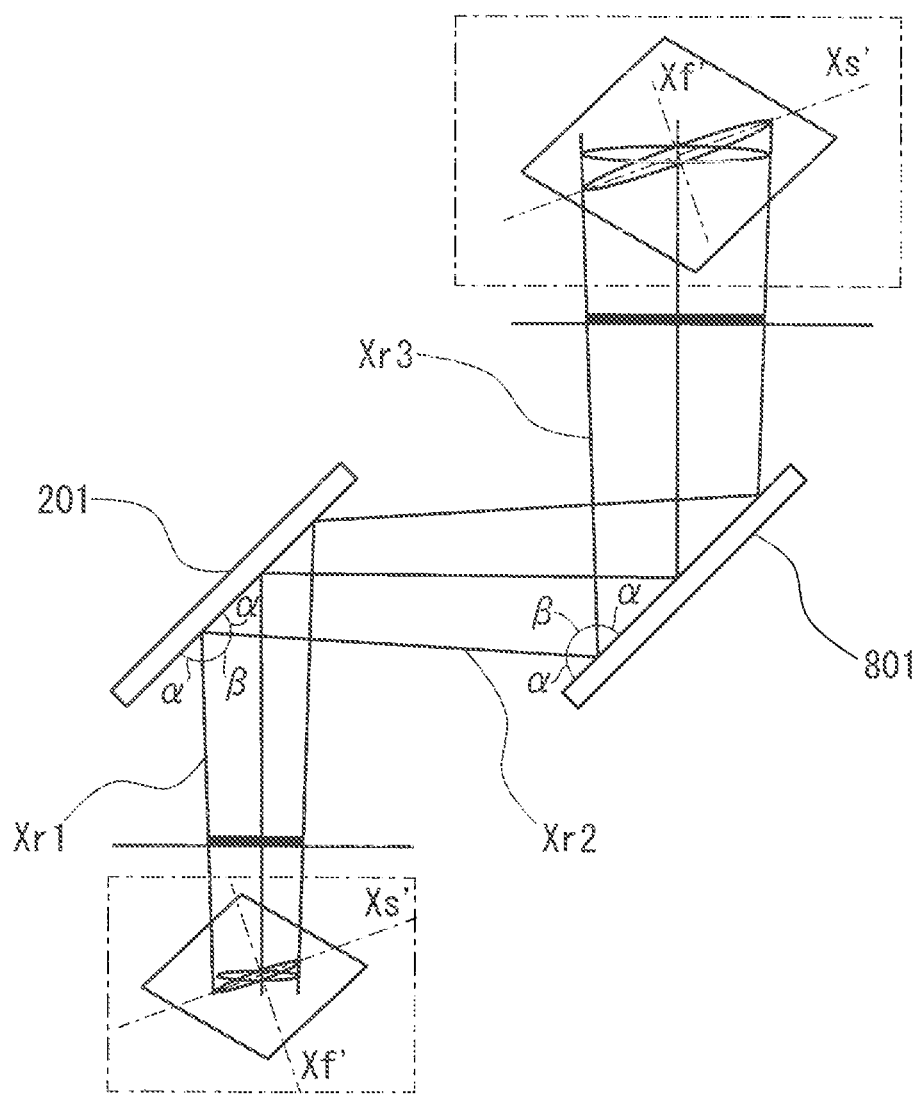
FIG. 9 is a schematic diagram illustrating the motion of light beams with respect to a set of parallel reflection mirrors.

The following description provides easy understanding of the reason why the inclination angle θ of the bundles of laser array light is zero. FIG. 9 simply illustrates imaginary rays of light reflected by a set of two parallel mirrors whose reflective surfaces face each other. FIG. 9 is a schematic diagram illustrating the motion of light beams with respect to the set of the parallel reflection mirrors. As illustrated in FIG. 9, incoming light beams Xr1 are reflected at a mirror 201 to constitute reflected light beams Xr2, and the reflected light beams Xr2 are further reflected at a mirror 801 to constitute outgoing light beams Xr3. In other words, the mirror 201 corresponds to the first reflection mirror 21; the mirror 801, to the second reflection mirror 81; a direction of the incoming light beams Xr1, to the first direction; a direction of the reflected light beams Xr2, to the second direction; and a direction of the outgoing light beams Xr3, to the third direction. In addition, FIG. 9, although illustrates an area that is not defined by a one-dot chain line in a two-dimensional manner, illustrates an area that is defined by the one-dot chain line in partly perspective for easy viewing of the direction of the bundle of laser array light.

Each light beam reflected at the mirrors has an incoming angle and outgoing angle equal to each other, and a straight line intersecting parallel lines have alternate angles equal to each other. Hence, four angles α in FIG. 9 are all equal. Consequently, two angles β are equal as well; and since alternate angles formed by the reflected light beam Xr2 are equal, the incoming light beam Xr1 and the outgoing light beam Xr3 are in parallel with each other after all. If the bundle of light, which is an aggregation of light, enters the mirror 201, the incoming light beam Xr1 and the outgoing light beam Xr3 would be in parallel with each other for each beam of the bundle of light; and this relationship would be the same in the bundle of light entering the mirror 201 at any angles. In other words, if the longer-axis Xs' and shorter-axis Xf' of the elliptic bundle of light are inclined at any angles relative to the mirror, the longer-axis Xs' and the shorter-axis Xf' would never twist. Here, the ray of light emitted from each of the laser light sources 11, 12, 13, 14 and the bundle of laser array light bent in the third direction can be replaced with the incoming light beam Xr1 and outgoing light beam Xr3 in FIG. 9. In this case, the bundle of laser array light bent in the third direction is in parallel with the ray of light emitted from the laser light source and is inclined at zero degrees.

As illustrated in FIGS. 6A and 6B, the adjacent bundles of laser array light are about 2.4 mm distant from each other, where the first reflection mirror disposed in a height of 20 mm from a light-emitting point has rotation angle of 3.5 degrees and where the adjacent laser light sources are 40 mm distant from each other. The bundles of laser array light from the laser light source 11 and laser light source 14 have long lengths of optical paths, and thus have images of about 19 mm in longer-diameter (longer-axis). The bundles of laser array light from the laser light sources 12 and 13, which are adjacent to the middle of the laser light source device 1, have short lengths of optical paths, and thus have images of about 16 mm in longer-diameter (longer-axis). Accordingly, an imaginary rectangular that surrounds the four images of the bundles of light has a size of about 10 mm×about 19 mm. Consequently, such a configuration achieves a far larger density than a basic configuration, on an as-is basis, of the laser light source device 1 in which the four laser light sources 11, 12, 13, and 14 are continuously arranged with 40 mm pitches, and such configuration minimizes an increase in etendue.

Figure 10:
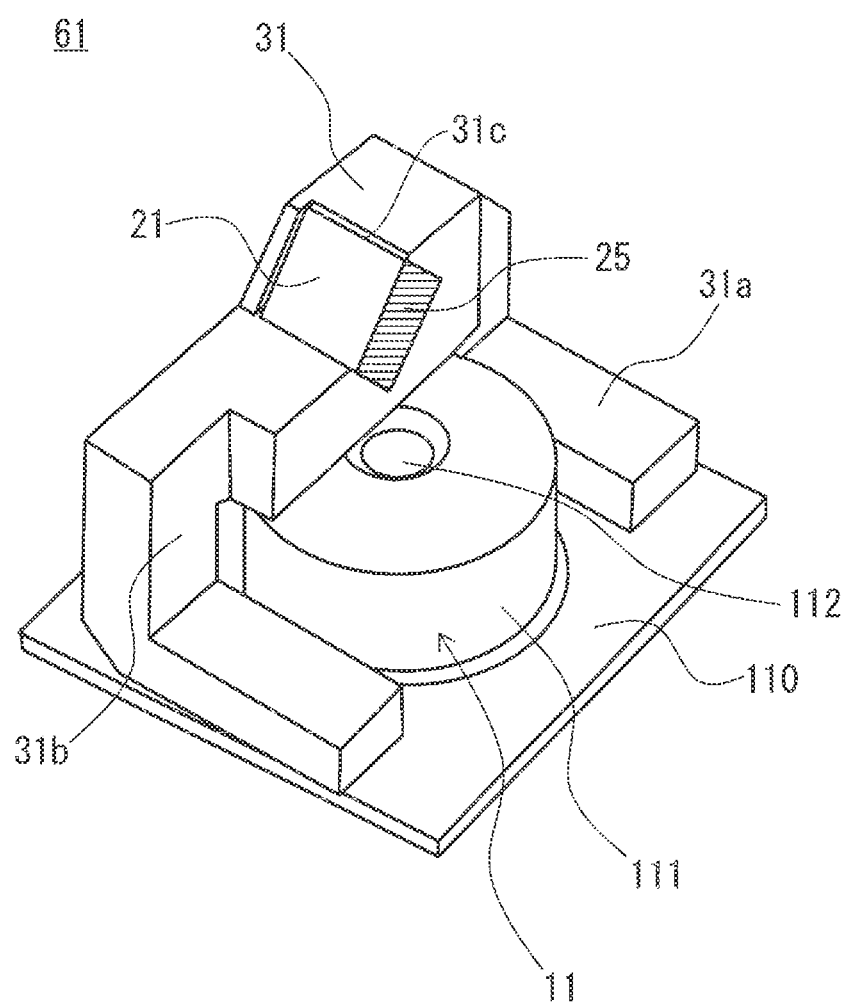
FIG. 10 is a schematic diagram of a mirror holder for the first reflection mirror.

The following describes the mirror holder 31 with reference to FIG. 10. FIG. 10 is a schematic diagram of the mirror holder 31 for the first reflection mirror 21. The mirror holder 31 is disposed on the stem 110 for holding the first reflection mirror 21. The laser light source device 1 includes other mirror holders holding the respective first reflection mirrors 22, 23, and 24 illustrated in FIGS. 1A, 1B, and 1C, in addition to the mirror holder 31 holding the first reflection mirror 21. The mirror holder 31 has the same configuration as that of the mirror holder for the first reflection mirror 24 except a positioning structure, and the details of the mirror holders for the first reflection mirrors 22 and 23 will follow. Accordingly, reference herein is made to the mirror holder 31.

The mirror holder 31 includes a pair of legs 31a and a body 31b. The mirror holder 31 is fixed to the upper surface of the stem 110 by the legs 31a. The body 31b is disposed above the cap 111. The pair of legs 31a is provided to extend from the lower edge of the body 31b in a direction parallel with the stem 110. In addition, the pair of legs 31a includes a positioning structure with respect to the stem 110.

The body 31b has a first inclined surface 31c that sets an optical surface (reflective surface) of the first reflection mirror 21 to be inclined at 45 degrees, and is capable of fixing a part of the first reflection mirror 21 while supporting the first reflection mirror 21 from its back surface using a retaining means, which is not shown. The first reflection mirror 21 is desirably a front surface mirror. For the front surface mirror, variations in thickness and distortions of base materials are almost negligible, and providing a stable, reflective surface improves accuracy of bending rays of light.

The optical surface (reflective surface) of the first reflection mirror 21 is in surface-to-surface contact with the first inclined surface 31c while facing the first inclined surface 31c. Thus, the optical surface is regarded as the same as the first inclined surface 31c, and is easy to be formed at low cost using mirror components that are available in large quantity without the need for caring about, for instance, transmittances of the base materials. Further, the first reflection mirror 21 is placed so that the effective area 25 of the first reflection mirror 21, illustrated by an obliquely hatched area in FIG. 10 is positioned above the windowpane 112 while protruding from the first inclined surface 31c of the mirror holder 31. The effective area 25 of the first reflection mirror 21 in view of a size margin is a rectangular with a size of about 9 mm×3 mm. The first reflection mirror 21 is desirably cut to form its side near which the bundle of laser array light passes through so that the effective area extends to the outermost periphery of the first reflection mirror 21. It is noted that how much the effective area protrudes from the first inclined surface of the mirror holder is adjustable for each mirror holder, and is flexible to variations in the individual laser light sources.

The body 31b has a shape that does not interfere the ray of laser light emitted from the windowpane 112, whereas the legs 31a have ends extending to a position that allows the legs 31a to sandwich the cap 111 in order to allocate an installation area. The mirror holder 31 has a sufficient installation area with respect to the stem 110. This enables the mirror holder 31 to be stably assembled on the stem 110. A typical example of the retaining means for the first reflection mirror 21 is a spring means made of a metal thin plate, for pushing the first reflection mirror 21 from its back surface using a spring pressure. However, for the auxiliary use of an adhesive, the laser light source 11 is sealed by the cap 111. This prevents a gas generated from the adhesive entering the inside of the cap 111 to contaminate components disposed within the cap 111.

To facilitate the handling and assembling of the first reflection mirror 21, and to enhance accuracy in position of the optical surface of the first reflection mirror 21 and enhance stability of holding, an attachment surface of the first reflection mirror 21, brought into contact with the first inclined surface 31c of the mirror holder 31 desirably has twice to three times or more as large an area as the effective area 25. Such a shape of the mirror facilitates the handling of the first reflection mirror 21 itself so as to enhance the workability of assembling. Additionally, when an adhesive, for instance, is applied to a position apart from the effective area 25 so as to firmly fix the mirror, such a shape of the mirror also reduces possible contamination of the first reflection mirror 21 during assembly work. This enables yields of assembling steps of the mirror holder 31 to be enhanced. The mirror holder 31 is desirably made of a metal material that is processable and is resistant to deformation. In some embodiments, a resin material is used that has a high creep-resistance and a high heat-resistance. For the metal material, items with the same shape may be produced at low cost by, for instance, die-casting; and further, a portion that needs to have an accurate shape may undergoes a secondary processing to increase flatness or parallelism and may be provided with a positioning reference hole or reference pin.

Figure 11:
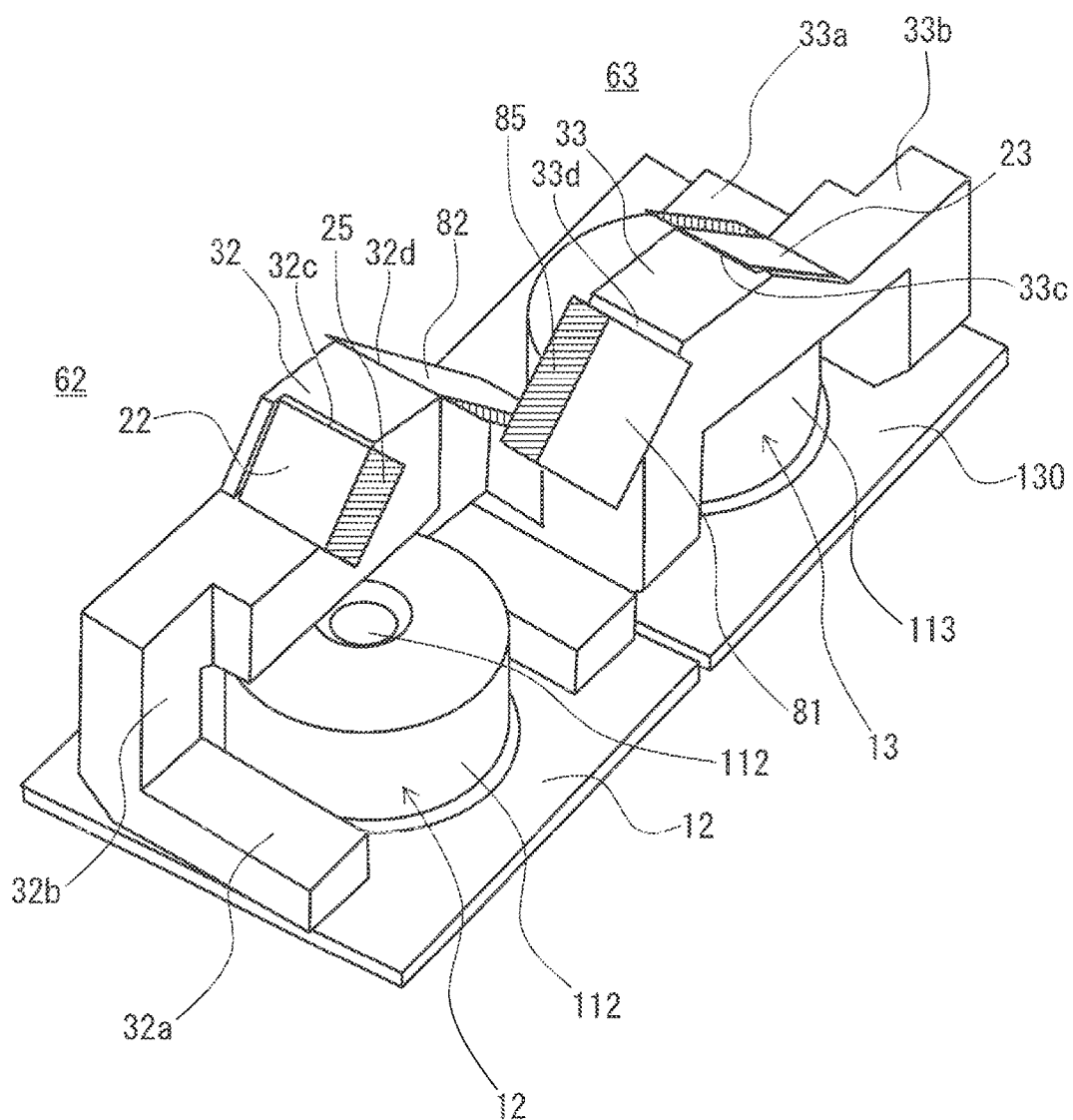
FIG. 11 is a schematic diagram of the mirror holder for the first reflection mirror and a mirror holder for the second reflection mirror.

The following describes holder structures holding the second reflection mirrors 81 and 82, by using a mirror holder 32 provided to be adjacent to the mirror holder 31 and further by using a mirror holder 33 provided to be adjacent to the mirror holder 32. FIG. 11 is a schematic diagram of the mirror holders 32 and 33 for the first reflection mirrors 22 and 23 and for the second reflection mirrors 81 and 82. As illustrated in FIG. 11, the mirror holder 32 has a second inclined surface 32d that sets the back side of an optical surface (reflective surface) of the second reflection mirror 82 to be inclined at 45 degrees with respect to a horizontal surface. The mirror holder 32 is capable of supporting a part of the second reflection mirror 82 from its front surface using a retaining means, which is not shown, so as to fix the second reflection mirror 82. The second inclined surface 32d is disposed in a body 32b of the mirror holder 32, and is set to be inclined at 90 degrees with respect to the first reflection mirror 22.

The mirror holder 33 likewise has a second inclined surface 33d that set the back side of an optical surface (reflective surface) of the second reflection mirror 81 to be inclined at 45 degrees with respect to a horizontal surface. The mirror holder 33 is capable of supporting a part of the second reflection mirror 81 from its front surface using a retaining means, which is not shown, so as to fix the second reflection mirror 81. The second inclined surface 33d is disposed in a body 33b of the mirror holder 33, and is set to be inclined at 90 degrees with respect to the first reflection mirror 23. It is noted that the second reflection mirrors 81 and 82 are desirably front surface mirrors, like the first reflection mirrors 21, 22, 23, and 24.

The following describes a relationship among the mirror holders, the first reflection mirrors, the second reflection mirrors, and the bundles of laser array light. The bundles of laser array light reflected at the first reflection mirrors 21 and 22 on the mirror holders 31 and 32 are radiated to the second reflection mirror 81 on the mirror holder 33, and are reflected at the second reflection mirror 81. The bundles of laser array light reflected at the first reflection mirror 23 on the mirror holder 33 and at the first reflection mirror 24 on the mirror holder for the first reflection mirror 24 are radiated to the second reflection mirror 82 on the mirror holder 32, and are reflected at the second reflection mirror 82. In addition, the mirror holder 31 and the mirror holder for the reflection mirror 24 respectively support the first reflection mirror 21 and the first reflection mirror 24, but do not need to support the second reflection mirror.

Figure 12:
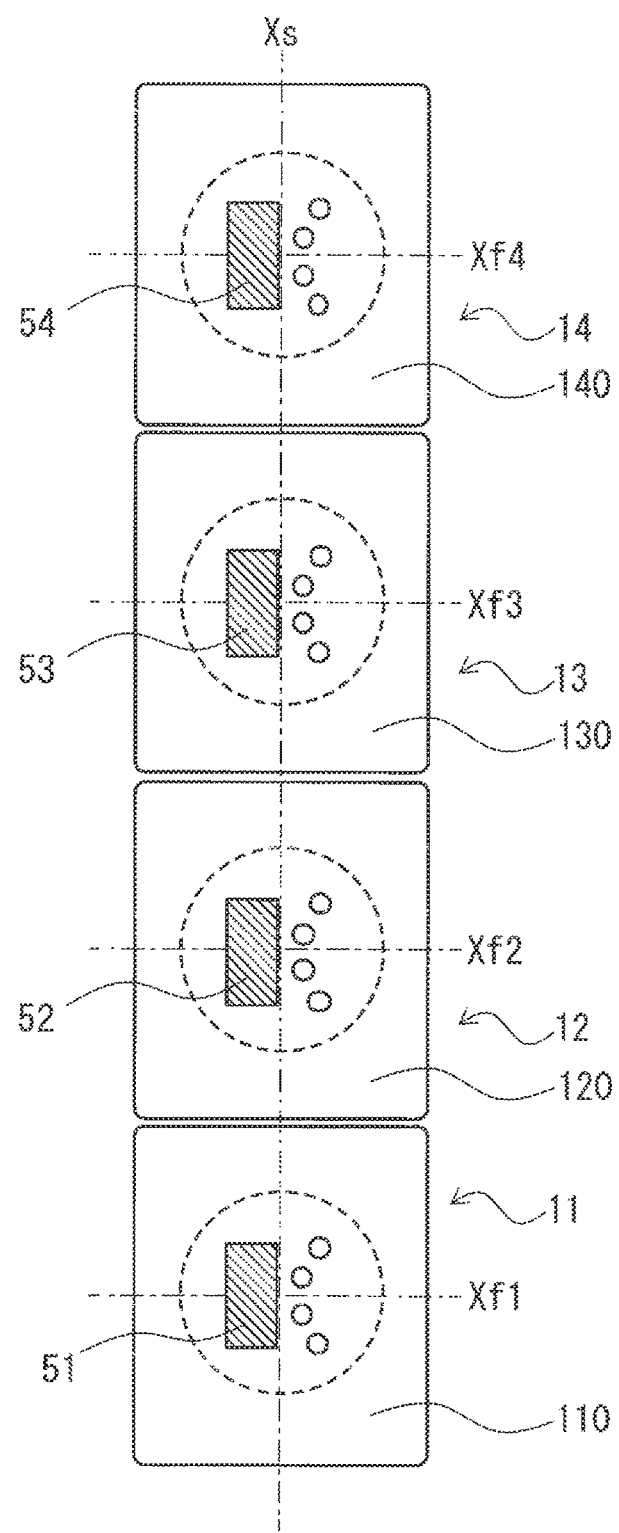
FIG. 12 is a schematic diagram of four laser light sources arranged in the same direction, viewed from the opposite side of a location where the rays of laser light are emitted.

FIG. 12 is a schematic diagram of the four laser light sources 11, 12, 13, and 14 arranged in the same direction, viewed from the opposite side of a location where rays of laser light are emitted. As illustrated in FIG. 12, the laser light sources 11 and 12 and the laser light sources 13 and 14 are all arranged in the same direction to preferentially reflect the alignment of cooled surfaces 51, 52, 53, and 54, which will be described later on. Hence, the mirror holders 31 and 32 are 180 degrees opposite to the mirror holder 33 and to the mirror holder for the first reflection mirror 24 in a horizontal direction. Accordingly, the mirror holders 31 and 32 are symmetrical with the positioning structures of the mirror holder 33 and of the mirror holder for the first reflection mirror 24, and thus need to have components different from those of these positioning structures. Alternatively, the mirror holders 31 and 32 can be point-symmetrical with the positioning structures of the mirror holder 33 and of the mirror holder for the first reflection mirror 24 if the mirror holders 31 and 32 are 180 degrees opposite to these positioning structures. On the basis of such a positional relationship, the mirror holder 31 and the mirror holder for the first reflection mirror 24 have the same shape, and the mirror holders 32 and 33 have the same shape.

The mirror holders are so configured as mentioned. This facilitates not only enhancing the accuracy of each single mirror holder, but also enhancing the accuracy in relative positions of the mirror holders adjacent to each other as a result of being assembled on the basis of the base plate 3. In addition, the mirror holders are individually replaceable and repairable in any problems during manufacture or any failures during use. The configuration of the mirror holders also enables problems in assembling steps to be flexibly addressed and also contributes to a further serviceable product.

As illustrated in FIG. 8, the bundles of laser array light from the individual laser light source 11, 12, 13, and 14, which are in parallel with each other, are compatible with a liquid crystal display apparatus that uses polarized light. Each mirror holder, which includes the positioning structure in its legs, is adjustable while rotating relative to the stem so as to make a slight adjustment to angles of rotation of the first reflection mirror and of the second reflection mirror. This enables an improvement in contrast performance of the liquid crystal display apparatus in order to improve a degree of polarization.

As illustrated in FIG. 11, the body 32b of the mirror holder 32 supports the first reflection mirror 22 and the second reflection mirror 82. In addition, the body 33b of the mirror holder 33 supports the first reflection mirror 23 and the second reflection mirror 81. Consequently, the first reflection mirror 22 and the second reflection mirror 82 integrally rotate at the angle θ, or the first reflection mirror 23 and the second reflection mirror 81 integrally rotate at the angle θ. This facilitates setting the angles of the plurality of mirrors.

As already mentioned, the mirror holder 32 supports the first reflection mirror 22 and the second reflection mirror 82; and the mirror holder 33, the first reflection mirror 23 and the second reflection mirror 81. In some embodiments, different mirror holders support these reflection mirrors.

The adjacent laser light sources are aligned in the above description. This alignment is advantageous in terms of a space factor of the laser light source device 1, and is also preferable in light of the cooling of the laser light source. The following describes the details with reference to FIG. 12. In FIG. 12, sets of four small circles disposed on the right of the axis Xs each denote two pairs of anode and cathode pins. The laser light sources 11, 12, 13, and 14 include laser chips disposed at starting points, i.e., at respective intersections of the optical axis Xs and optical axis Xf1, of the optical axis Xs and optical axis X12, of the optical axis Xs and optical axis Xf3, and of the optical axis Xs and optical axis Xf4. Specifically, thin-plate laser chips are mounted at the side surfaces of blocks (not shown) attached to stems 110, 120, 130, and 140. Hence, the bottom surfaces of the blocks are positioned on one side of the optical axis Xs, as illustrated by obliquely hatched areas in FIG. 12.

Heat generated in the laser chips is radiated via these blocks. Thus, the obliquely hatched areas are the respective cooled surface 51, 52, 53, and 54 of the laser light sources 11, 12, 13, and 14. As illustrated in FIG. 12, the laser light sources 11, 12, 13, and 14 are aligned in the same direction; accordingly, the cooled surface 51 of the laser light source 11, the cooled surface 52 of the laser light source 12, the cooled surface 53 of the laser light source 13, and the cooled surface 54 of the laser light source 14 are aligned. Such alignment is advantageous in designing a cooling structure while avoiding the anode pin and the cathode pin.

Figure 13:
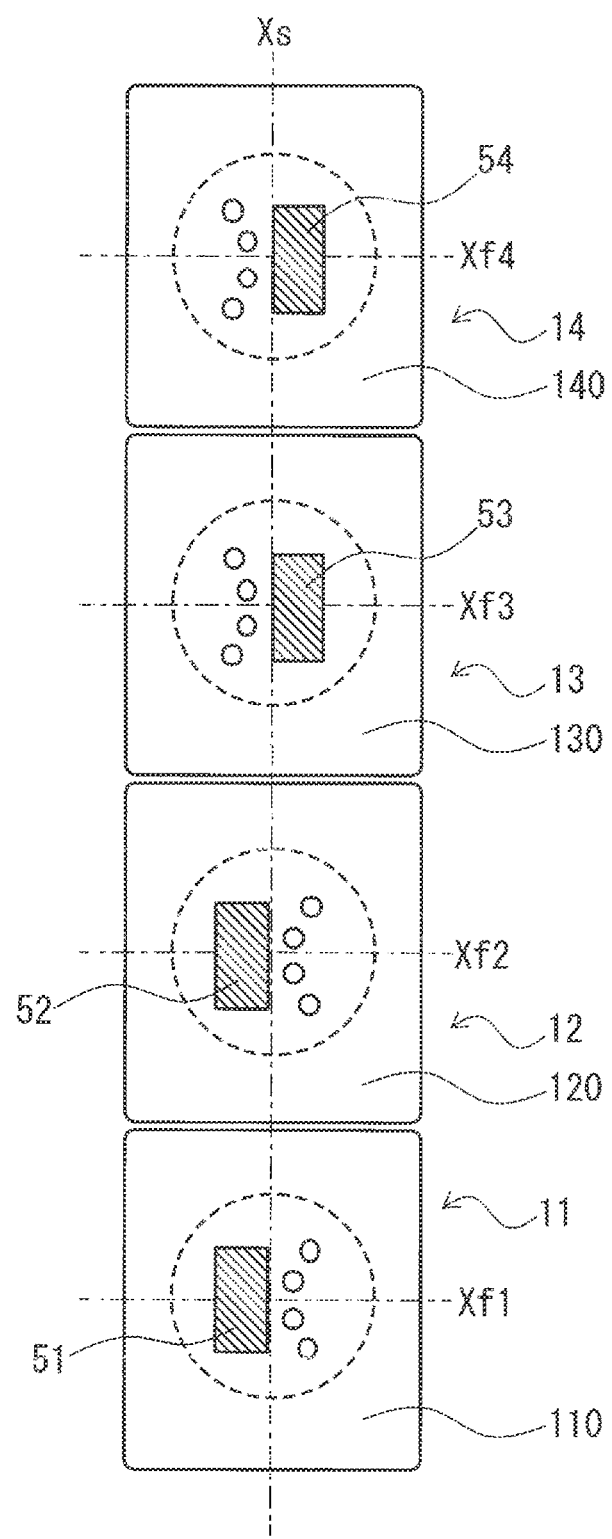
FIG. 13 is a schematic diagram of pairs of two of the four laser light sources arranged to face each other, viewed from the opposite side of the location where the rays of laser light is emitted.

However, all the cooled surfaces 51, 52, 53, and 54 of the laser light sources 11, 12, 13, and 14 do not need to be aligned. When the cooling structure is, for instance, possibly divided into two parts, the laser light sources 11 and 12 in a pair, and the laser light sources 13 and 14 in a pair can be disposed in positions facing each other. FIG. 13 illustrates this possible state. FIG. 13 is a schematic diagram of pairs of two of the four laser light sources arranged to face each other, viewed from the opposite side of the location where the rays of laser light are emitted. In this case, such arrangement enables the mirror holder 31 and the mirror holder for the first reflection mirror 24 to have the completely same shape, and also enables the mirror holders 32 and 33 to have the completely same shape, as described above. This provides more flexibility in designing the mirror holders.

The above description is based on the first reflection mirrors and second reflection mirrors having the same angle of rotation, and on the plurality of bundles of laser array light spatially combined while keeping parallel with each other. In some embodiments, the angles of rotation of the first reflection mirrors can be adjusted little by little to be different from each other, and the bundles of laser array light can be combined to tend to be focused in general. In this way, the adjustment of the angles of rotation of the first reflection mirrors, alone, enables fine adjustment of a density of the bundles of light within a range that does not go beyond an allowable value of the etendue of the bundles of light as combined.

The above description is also based on the bundle of laser array light having an anisotropy of the divergence angle at which the bundle of laser array light greatly expands in one direction. In some embodiments, different design of the cylindrical lens or addition of an optical element can reduce this anisotropy. In this case, an increase in density of the bundle of light is likewise achieved.

As described above, the laser light source device 1 according to the first embodiment is configured such that the laser light source units 61 and 62, and the laser light source units 63 and 64 are arranged in series to face each other. The laser light source device 1 is also configured such that the individual rays of laser light are reflected in the same direction by the first reflection mirrors 21, 22, 23, and 24, which are disposed on the respective optical axes of the rays of laser light, and by the second reflection mirrors 81 and 82. Such a configuration enables the spatial combination of the rays of laser light with a minimum increase in etendue while keeping the optical axis parallel with each other.

Using the second reflection mirrors 81 and 82 achieves a shorter length of the entire optical path than projecting the rays of laser light in a direction in which the laser light source units 61, 62, 63, and 64 are arranged (in a direction of a reference line L) by using only the first reflection mirrors 21, 22, 23, and 24. This minimizes the enlargement of the cross section of the ray of laser light due to the divergence angle to thus achieve a further small laser light source device.

The optical axis of the bundle of laser array light is not inclined with respect to the laser light source device 1. Hence, various problems due to the inclined optical axis X1 are eliminated in mounting the laser light source device 1.

The individual laser light source units 61, 62, 63, and 64 are configured such that the mirror holders of the same type support the respective first reflection mirrors of the same type. Such a configuration minimizes types of components and provides an inexpensive and small, easy-to-be-assembled laser light source device and further provides an inexpensive and small video display device provided with the same.

The first reflection mirrors 21, 22, 23, and 24, and the second reflection mirrors 81 and 82 are each capable of setting the angle of rotation with respect to the optical axis of the ray of laser light emitted from the laser light source. This enables the angle of rotation to be specified in such a manner that the ray of laser light reflected from the second direction to the third direction does not interfere the first reflection mirror of the adjacent light source unit in a travelling direction of the ray of laser light, and the second reflection mirror. Consequently, the laser light source device 1 is formed with a less optical loss.

The plurality of laser light source units 61 and 62 and plurality of laser light source units 63 and 64, which are arranged in series to face each other, are arranged in such a manner that directions of longer-axes of the elliptic cross sections of the rays of laser light are in conformity with each other. Hence, by virtue of the action of the aforementioned first reflection mirrors 21, 22, 23, and 24 and of the aforementioned second reflection mirrors 81 and 82, setting a small rotation-angle of several degrees or smaller enables the rays of laser light from the plurality of laser light sources to be rearranged close to each other in directions of the shorter-axes of the ellipses to thus achieve the spatial combination with high density.

The second reflection mirror 81 is provided in parallel with the first reflection mirrors 21 and 22 with the reflective surface of the second reflection mirror 81 facing the reflective surfaces of the first reflection mirrors 21 and 22; in addition, the second reflection mirror 82 is provided in parallel with the first reflection mirrors 23 and 24 with the reflective surface of the second reflection mirror 82 facing the reflective surfaces of the first reflection mirrors 23 and 24. This enables the rays of laser light to be efficiently reflected in the third direction, and enables the length of the entire optical path to be much shorter.

The plurality of laser light sources 11, 12, 13, and 14 are continuously arranged on the same plane of the base plate 3. Such arrangement facilitates the arrangement of the cooled surfaces of these laser light sources on the same plane, and enhances cooling performance to thus possibly increase output. Further, in this case, the laser light source device 1 is formed to be slim in a direction perpendicular to a direction of an axis where the bundle of laser array light is emitted. Hence, a stack of a plurality of laser light source devices 1 would be miniaturized.

The laser light source device 1 can be miniaturized. Accordingly, the packaging can be miniaturized, and also the transportation becomes easier. In addition, the combination into a bundle of laser array light with a high spatial density is performed to efficiently focus light. This can reduce the amount of energy consumption.

The bundles of laser array light from the plurality of laser light sources 11, 12, 13, and 14, which need to be disposed in the position distant by the length of the sides of the stem 110, are spatially rearranged in high density. This enables a combined bundle of light with small etendue and an excellent capability of focusing light.

Second Embodiment

Figure 14:
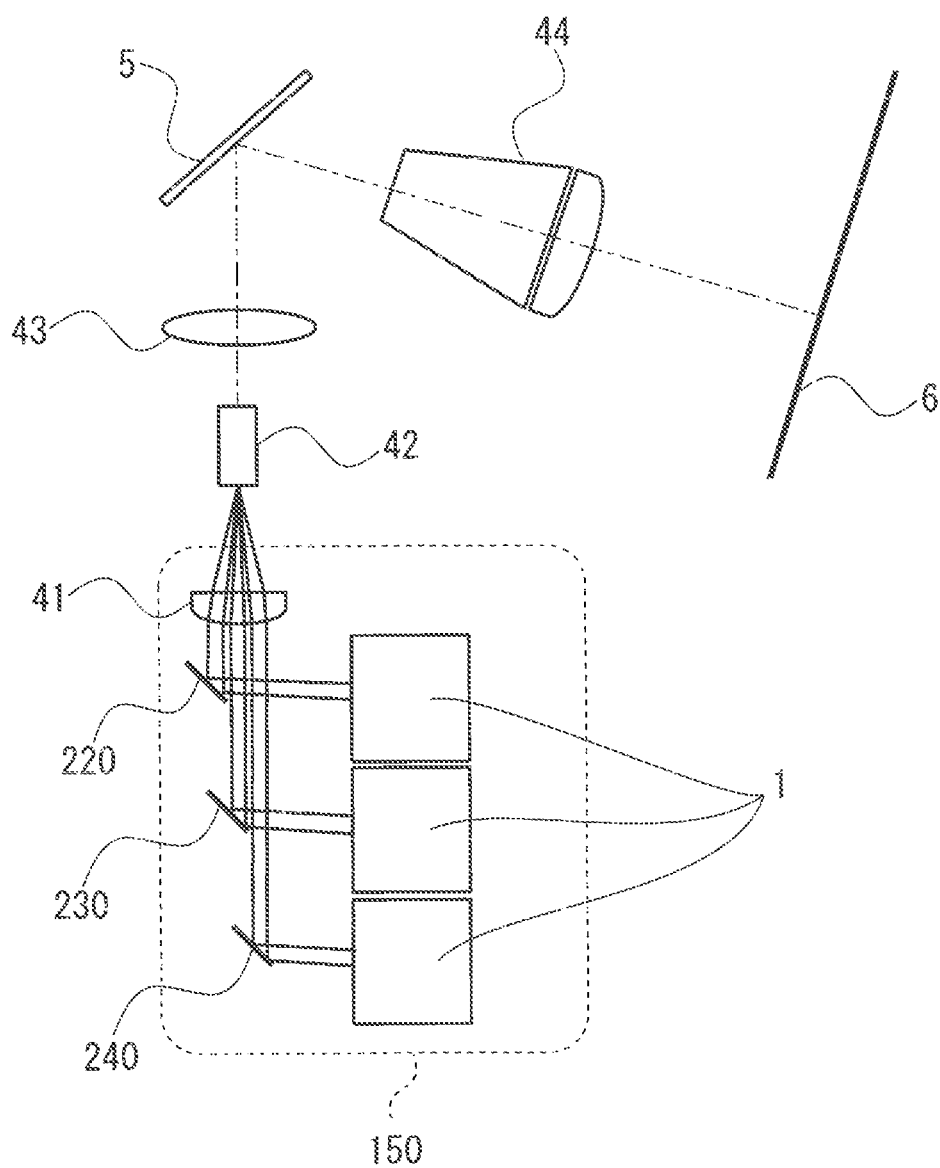
FIG. 14 is a schematic diagram of a configuration of a video light source device according to a second embodiment.

The following describes a laser light source device 150 and video display device according to a second embodiment. FIG. 14 is a schematic diagram of a configuration of the video light source device according to the second embodiment. It is noted that in the second embodiment, the same components as those described in the first embodiment are denoted by the same symbols and that the description of the same components is omitted.

As illustrated in FIG. 14, the video display device according to the second embodiment includes a laser light source device 150, an integrator rod 42 that is an equalization unit, a relay lens 43 that is an illumination optical system, a light valve 5 that is a video display element, and a projection lens 44 that is a projection optical system.

The laser light source device 150 includes a plurality of (for instance, three) laser light source devices 1, mirrors 220, 230, and 240 that bend the bundles of laser array light from the individual laser light source devices 1, and a condenser lens 41 that is a means for focusing the bundles of laser array light from the individual mirrors 220, 230, and 240. The laser light source devices 1 are each slim rectangular-parallelepipeds in an optical axis. Thus, the laser light source devices 1 are preferably arranged all over the same plane in view of space. The bundles of laser array light focused by the condenser lens 41 are received by the integrator rod 42 to undergo equalization of an intensity distribution. The bundles of laser array light as equalized are radiated to the light valve 5 as illumination light by the relay lens 43. The illumination light radiated to the light valve 5 is spatially modulated in response to an external video signal. The illumination light as spatially modulated is enlarged and then projected on a screen 6 by the projection lens 44.

The mirrors 220, 230, and 240 are stepwise arranged, and are used to spatially combine the bundles of laser array light from the individual laser light source devices 1 for increasing the density of the bundles of light. For the laser light source device 150 to include more laser light source devices 1, changing specifications of the condenser lens 41 enables the bundles of laser array light to be efficiently transmitted to the integrator rod 42.

Figure 15:
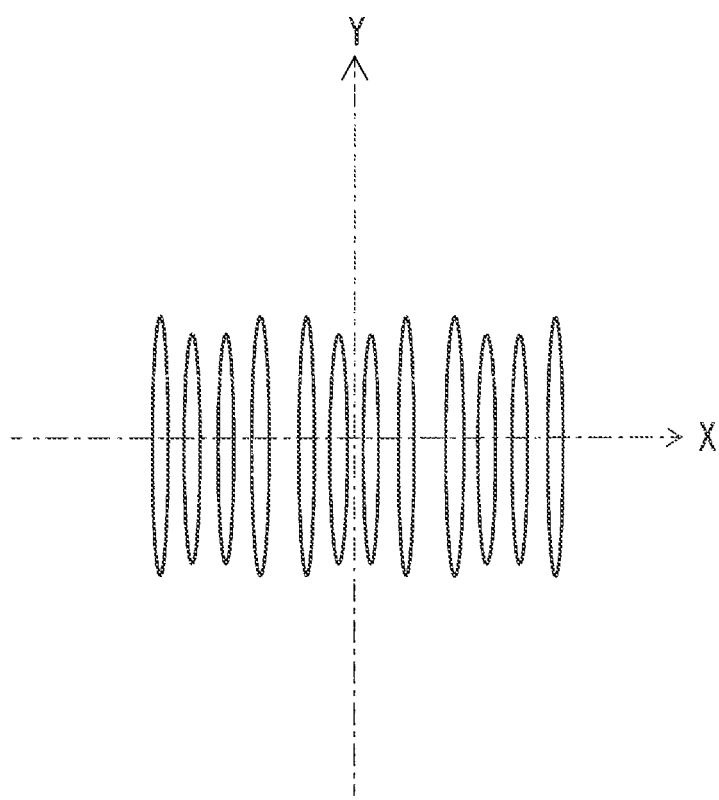
FIG. 15 is a schematic diagram of a distribution of the bundles of laser array light from the laser light source device.

For instance, FIG. 15 is a schematic diagram of a distribution from the bundles of laser array light of the laser light source device 150. That is, FIG. 15 schematically illustrates a distribution of images of the bundles of laser array light from these individual laser light source devices 1, arranged on an incident surface of the condenser lens 41, in the case of three laser light source devices 1 being arranged. As a result of the stepwise arrangement of the mirrors 220, 230, and 240, the images of the bundles of laser array light are densely arranged along an x-axis. This is the same direction as the direction in which the laser light source devices 1 are arranged all over the plane as illustrated in FIG. 14. Each bundle of laser array light is schematically illustrated by a slim ellipse. Its shorter-axis direction has a high degree of parallelism of light beams. This enables the condenser lens 41 to focus the bundles of laser array light in very high density.

Meanwhile, a y-axis direction has a low degree of parallelism of the light beams. Hence, the arrangement of the bundles of laser array light along the y-axis direction is desirably avoided. In addition, the individual bundles of laser array light are arranged in the same direction along the x-axis direction, and longer-axis directions of their ellipses are the same direction along the y-axis direction. This facilitates the design of the video display device.

As described above, the video display device according to the second embodiment includes the laser light source device 150, the integrator rod 42 equalizing the intensity distribution of the rays of laser light emitted from the laser light source device 150, the relay lens 43 radiating the rays of laser light equalized by the integrator rod 42 as the illumination light, the light valve 5 spatially modulating the illumination light in response to the external video signal, and the projection lens 44 projecting the illumination light spatially modulated by the light valve 5 on the screen 6. Consequently, the combination into a bundle of laser array light with a high spatial density is performed to efficiently focus light. This can increase output.

The inexpensive and small laser light source device 1 as described in the first embodiment enables the laser light source device 150 to be inexpensive and small, to thus achieve an inexpensive and small video display device.

While the invention has been shown and described in detail, the foregoing description is in all aspects illustrative and not restrictive. It is therefore understood that numerous modifications and variations can be devised without departing from the scope of the invention.

It is to be noted that in the present invention, the individual preferred embodiments can be freely combined, or can be modified and omitted as appropriate, within the scope of the invention.

DESCRIPTION OF REFERENCE NUMERALS 1 laser light source device, 5 light valve, 11, 12, 13, 14 laser light source, 21, 22, 23, 24 first reflection mirror, 31, 32, 33 mirror holder, 42 integrator rod, 43 relay lens, 44 projection lens, 61, 62, 63, 64 laser light source unit, 81, 82 second reflection mirror, 150 laser light source device.

The invention claimed is:

1. A laser light source device comprising a plurality of laser light source units,
   said plurality of laser light source units each including
      a laser light source emitting a ray of laser light having an elliptic cross section in a first direction,
      a first reflection mirror disposed on an optical axis of said ray of laser light and reflecting said ray of laser light in a second direction, and
      a mirror holder holding said first reflection mirror,
   said plurality of laser light source units being arranged in such a manner that said plurality of laser light source units adjacent to each other adjoin each other in series,
   said laser light source device further comprising a second reflection mirror reflecting, in a third direction, said ray of laser light reflected in said second direction,
   said second reflection mirror being held by said mirror holder belonging to one laser light source unit among said plurality of laser light source units.

2. The laser light source device according to claim 1,
   wherein said plurality of laser light source units are arranged in such a manner that directions of longer-axes of said elliptic cross sections of said rays of laser light reflected in said second direction are in conformity with each other, and
   wherein each of said first reflection mirrors is capable of setting an angle of rotation with respect to said optical axis of said ray of laser light emitted from each of said laser light sources in such a manner that said direction of said longer-axis of said elliptic cross section of said ray of laser light reflected in said second direction, and said second direction form a predetermined angle.

3. The laser light source device according to claim 1, wherein said second reflection mirror is provided in parallel with said first reflection mirror with a reflective surface of said second reflection mirror facing a reflective surface of said first reflection mirror.

4. A video display device comprising:
   said laser light source device including a plurality of laser light source units,
   said plurality of laser light source units each including
      a laser light source emitting a ray of laser light having an elliptic cross section in a first direction,
      a first reflection mirror disposed on an optical axis of said ray of laser light and reflecting said ray of laser light in a second direction, and
      a mirror holder holding said first reflection mirror,
   said plurality of laser light source units being arranged in such a manner that said plurality of laser light source units adjacent to each other adjoin each other in series,
   said laser light source device further comprising a second reflection mirror reflecting, in a third direction, said ray of laser light reflected in said second direction,
   said second reflection mirror being held by said mirror holder belonging to one laser light source unit among said plurality of laser light source units;
   an equalization unit equalizing an intensity distribution of said rays of laser light emitted from said laser light source device;
   an illumination optical system radiating said rays of laser light equalized by said equalization unit as illumination light;
   a video display element spatially modulating said illumination light in response to an external video signal; and
   a projection optical system projecting said illumination light spatially modulated by said video display element on a screen.

* * * * *